United States Patent
Lopez et al.

[11] Patent Number: 6,094,730
[45] Date of Patent: Jul. 25, 2000

[54] HARDWARE-ASSISTED FIRMWARE TRACING METHOD AND APPARATUS

[75] Inventors: Ted J. Lopez; Scott A. Jones, both of Rocklin; Thomas M. Laffey, Roseville, all of Calif.

[73] Assignee: Hewlett-Packard Company, Palo Alto, Calif.

[21] Appl. No.: 08/958,291

[22] Filed: Oct. 27, 1997

[51] Int. Cl.[7] .................................................. G06F 13/00
[52] U.S. Cl. ................................ 714/28; 714/31; 714/38
[58] Field of Search ................... 714/28, 31, 27, 714/29, 30, 26, 25, 38

[56] References Cited

U.S. PATENT DOCUMENTS

| | | | |
|---|---|---|---|
| 5,220,658 | 6/1993 | Kerr | 395/500 |
| 5,325,512 | 6/1994 | Takahashi | 395/500 |
| 5,426,759 | 6/1995 | Padgaonkar | 395/425 |
| 5,463,760 | 10/1995 | Hamauchi | 395/500 |
| 5,546,562 | 8/1996 | Patel | 395/500 |
| 5,630,052 | 5/1997 | Shah | 395/183.14 |
| 5,640,542 | 6/1997 | Whitsel et al. | 395/500 |
| 5,802,347 | 9/1998 | Yabumoto | 395/500 |
| 5,862,148 | 1/1999 | Typaldos et al. | 371/22.1 |
| 5,911,059 | 6/1999 | Profit, Jr. | 395/500 |

FOREIGN PATENT DOCUMENTS

| | | | |
|---|---|---|---|
| 0 762 278 A1 | 3/1997 | European Pat. Off. | G06F 11/00 |
| 0 569 128 A2 | 11/1993 | United Kingdom | G06F 11/26 |
| 0 652 516 A1 | 5/1995 | United Kingdom | G06F 11/00 |

*Primary Examiner*—Norman M. Wright
*Attorney, Agent, or Firm*—Denise A. Lee

[57] ABSTRACT

The present invention provides a test and diagnosis system for testing an embedded processor. The test system includes an ASIC having an embedded microprocessor, a debug assist logic unit for monitoring the addresses and data from the embedded microprocessor, a debug kernel and an instruction overlay harness. When the debug assist logic block finds a predetermined set of match conditions, it interrupts the embedded microprocessor and transfers control from the code running on the microprocessor to the debug kernel. The debug kernel is coupled to the debug assist logic unit and responsive to user input, the debug kernel allows the user to trace processor transactions during code execution. A REMAP bit in the ASIC allows remapping of the microprocessor memory into a faster instruction overlay memory, allowing the code to be quickly modified during product debug.

11 Claims, 6 Drawing Sheets

| LOCATION / 402 | NAME / 404 | DESCRIPTION / 406 | |
|---|---|---|---|
| E01000h<br>E01002h<br>E01004h | ADDRESS HI_1<br>ADDRESS LO_1<br>DATA_1 | CONTROL, ADDRESS 23:16<br>ADDRESS 15:0<br>DATA 15:0 | } REG SET 1 |
| E01010h<br>E01012h<br>E01014h | ADDRESS HI_2<br>ADDRESS LO_2<br>DATA_2 | CONTROL, ADDRESS 23:16<br>ADDRESS 15:0<br>DATA 15:0 | } REG SET 2 |
| . . . | . . . | . . . | |
| E01070h<br>E01072h<br>E01074h | ADDRESS HI_8<br>ADDRESS LO_8<br>DATA_8 | CONTROL, ADDRESS 23:16<br>ADDRESS 15:0<br>DATA 15:0 | } REG SET 8 |
| E010fc<br>E010feh | DBINTSTS<br>DBID | INTERRUPT CONTROL/STATUS — 232<br>DAL ID 0x0996 — 234 | |

| ADDRES HI_x: | |
|---|---|
| BITS | DEFINITION |
| 15:12 | CONTROL    0h = DISABLED<br>1h = ADDRESS MATCH ONLY<br>2h = ADDRESS MATCH ON READ<br>3h = ADDRESS MATCH ON WRITE<br>4h = ADDRESS AND DATA MATCH ONLY<br>5h = ADDRESS AND READ DATA MATCH<br>6h = ADDRESS AND WRITE DATA MATCH<br>7-fh = RESERVED |
| 11:8 | RESERVED |
| 7:0 | CPU ADDRESS 23:16 |

| ADDRESS LO_x: | |
|---|---|
| BITS | DEFINITION |
| 15:0 | CPU ADDRESS 15:0<br>BIT 0 RESERVED, NOT USED IN DAL COMPARE. |

| DATA_x: | |
|---|---|
| BITS | DEFINITION |
| 15:0 | CPU DATA 15:0 |

| DBID | |
|---|---|
| BITS | DEFINITION |
| 15:0 | HARDWIRED 0x0996 |

| DBINTSTS: | |
|---|---|
| BITS | DEFINITION |
| 15:0 | 15    INT. ENABLE<br>14:12    IPL CODE<br>11    REMAP - IF SET, WILL REMAP<br>10:5    RESERVED<br>4:1    INT. ID, WHAT REGISTER SET SAW MATCH.<br>0    HIT |

HARDWARE-ASSISTED FIRMWARE TRACING METHOD AND APPARATUS

BACKGROUND OF THE INVENTION

Increasingly the control of sophisticated electronic systems is handled by microprocessors. For example, control of network cards for HP's standard printer products contain an interface controlled by an embedded microprocessor. Testing of microprocessor controlled electronic systems is typically done during the product development phase using an in-circuit emulator which simulates the microprocessor of the product under development. However, unlike the microprocessor used in the developed product, the emulator provides the user with the tools required to (1) investigate and dynamically alter the component of the system's executable code, (2) set breakpoints, (3) perform single stepping, and (4) report on and change internal register contents of the microprocessor.

Figure 1:
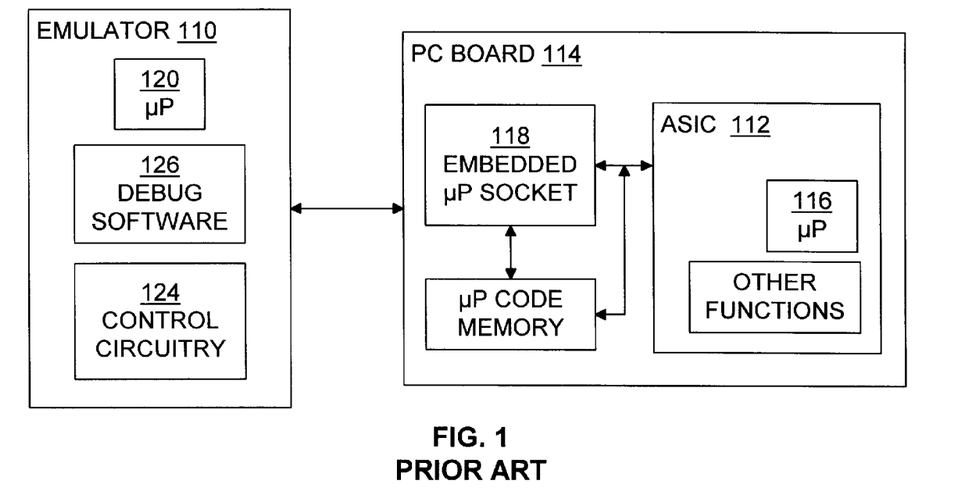
FIG. 1 shows a conventional emulator used for testing an embedded processor on a PC board.

FIG. 1 shows a conventional emulator 110 used for testing an embedded microprocessor 116 on a PC board 114. Referring to FIG. 1, the ASIC on the PC board includes an embedded microprocessor and control circuitry specific to the ASIC. The pinout of the ASIC 112 typically includes a pin out for all the signals of the embedded microprocessor. A PC board 114 includes a socket 118 which corresponds to the pinout of the embedded microprocessor 116. The socket 118 corresponding to the embedded microprocessor is electrically connected to the signals pinned out from the ASIC. The embedded microprocessor for the developed product is disabled and a cable having a suitable probe is inserted into the socket 118 of the removed microprocessor. The disabled embedded microprocessor (external mode) allows the emulator to take control of the ASIC and simulate the embedded microprocessor signals.

It is common for emulators to provide a means to select whether the emulator processor executes the system's code from memory actually located in the product under development or instead from memory located within the emulator itself. The emulator microprocessor 120 is embedded in suitable control circuitry 124 and includes debug software which allows the emulator microprocessor to be started, stopped, and which allows the internal registers of the emulator microprocessor to be inspected or changed. This allows the developer to trace, trap, single step, and modify code on the fly.

The emulator is a powerful tool for diagnosing problems in the system hardware or firmware. However, there are problems associated with test and diagnosis using an emulator. For example, as ASICs are designed using faster technologies, their embedded processors will be clocked at higher and higher frequencies. The microprocessor 116 inside the ASIC will then be running at a higher clock rate than the external emulator 110 can match. If the microprocessor clock speed is lowered for debugging or problem diagnosis with an emulator, a risk is introduced, since the system being debugged is then different from the system shipped to the customer. The difference in microprocessor clock frequency between the embedded microprocessor 116 and the emulator processor 120 may mask firmware or hardware problems that are only apparent at the full clock speed of the embedded processor.

A further problem with using an emulator is that its use often requires the development of an additional prototype. In addition to the product prototype, a firmware prototype must be created that can accommodate the emulator tool. For instance, if the product uses a microprocessor embedded into the ASIC, a second prototype will need to be created that provides a microprocessor socket for the emulator connection. A lower frequency microprocessor clock may also be needed. This additional prototype adds engineering and material costs to the project budget that can be avoided.

Another problem with in-circuit emulators is their limited flexibility. For example, conventional in-circuit emulator tools are specific to the type of processor used in the design. Therefore, if the system designer of the electronic system under development decides to use a different microprocessor, a new emulator tool will have to be purchased. Further conventional emulators typically have standard pins that need to be accessible. Because emulators have a standard configuration with a standard pin out, it is difficult to reduce the number of pins on the ASIC.

With respect to ASICs, conventional emulators require the ASIC to bring out appropriate external pins so that the emulator tool can attach to the ASIC. This implies two modes of operation for the ASIC: internal microprocessor use and external microprocessor use. The two modes of operation have discrepancies in timing that the ASIC team must design and simulate for. This adds time to the ASIC design cycle due to the time required to do verification for both modes of operation.

An alternative test tool to an emulator is a debugger. Using a debugger requires a communications port, card based debug code and a user interface that manages the system attached to the communications port of the ASIC. In general a code developer can perform many of the same functions as an in-circuit emulator but at a design speed with the actual card design. Similar to an emulator, a serial debugger has the disadvantage of being specific to a particular microprocessor. Newer processor families can have this debugging functionality built into their designs. They may have an embedded communications port with provided software to allow for debugging.

A test and diagnosis system for testing an embedded microprocessor which can work with different microprocessors or microprocessor families, that allows code to be tested at product speed instead of at the speed of the emulator and that eliminates the need for more than one prototype to fully test the product under development is needed.

SUMMARY OF THE INVENTION

The present invention provides a test and diagnosis system for testing an embedded processor which can test different microprocessors or microprocessor families, that allows code to be tested at the speed of the product under development, and that eliminates the need for more than one prototype to fully test the product under development. The test and diagnosis system includes an ASIC having an embedded microprocessor. However, unlike conventional ASICs, in the present invention the ASIC is modified to include a debug assist logic unit (DAL) for monitoring the address and data information accessed by the microprocessor memory. When the debug assist logic unit finds a match between the monitored information and the conditions stored in the DAL, it interrupts the embedded microprocessor and transfers control from the code running on the microprocessor to the debug kernel. The debug kernel or debug software is stored on a first memory unit which is coupled to the DAL. Responsive to user input, the debug software allows the user to trace processor transactions during code execution.

The DAL is embedded in the modified ASIC and allows the developer to program registers that will interrupt the embedded processor's normal execution. Typical interrupt conditions include an address match, a data match or an address and data match. Interrupt conditions (the control set) are stored in the DAL Typically the interrupt is based on the type/location/data access of the microprocessor.

Preferably the ASIC includes a Remote Access (REMA) port used to control the embedded microprocessor and the overlay harness memory. A monitoring means is electrically coupled to the REMA port of the ASIC which allows the user to be able to monitor externally the address/data fetches of the embedded microprocessor and to input commands to the debug kernel. For example, the user may input a command to modify the code to run on the embedded microprocessor or alternatively may input a command which sets a breakpoint in the code at a point that is of particular interest to the person doing the debug.

In the preferred embodiment of the present invention, the test and diagnosis system includes both FLASH memory and an instruction overlay harness. The instruction overlay harness is an alternative memory, typically SRAM, that can be used instead of FLASH memory. Thus, code can be downloaded into either FLASH memory or into the instruction overlay memory.

REMA ports have been integrated before onto conventional ASICs. In conventional ASICs, REMA ports are typically used to download code into FLASH memory at the factory. FLASH memory is typically written to at the factory, since the time it takes to write to FLASH is slow. Also, FLASH memory is not easily modifiable. With conventional FLASH memory products you can not modify a single location of FLASH memory, instead you must rewrite a whole sector. Because the instruction overlay memory is typically SRAM, code changes or software breakpoints made on the fly can be made much more quickly than with FLASH memory.

In the present invention, the REMA port is used to reprogram code on the overlay harness for debug purposes. Changes to the program code are made on the fly, with small changes being typical. The REMA port of the ASIC allows the developer to download information into the overlay harness memory of the product under development. The downloaded information is interpreted by the debug kernel which takes action by controlling the ASIC or Instruction overlay harness.

The instruction overlay harness is comprised of an instruction overlay control circuit and memory. The instruction overlay control circuit typically includes an address decoder, address buffers, data buffers and an enable register. Setting the REMAP bit in the DAL changes the address range in which Flash memory is enabled. After enabling remapping, the debug kernel can then enable the memory on the instruction overlay harness, which will then occupy the address the Flash had before enabling the remap feature. The debug kernel then loads program code into the instruction overlay harness. The REMAP feature, then, allows the Flash memory and the overlay memory to co-exist without bus contention.

The debug kernel is software that is loaded for use and started via the REMA port. Once invoked, the debug kernel responds to user input to download new program code to the instruction overlay harness, to manage the DAL registers, to transfer control back and forth between debug monitor mode and normal program execution mode, and to trace or trap processor transactions when executing the code under development.

The present invention reduces costs of development compared to conventional test methodologies. First, the test diagnostic system according to the present invention eliminates the need for and thus the costs associated with an in-circuit emulator. It also eliminates the costs associated with the use of two prototypes, since the actual product design can be used without the in-circuit emulator area requirements.

Another advantage of the present invention is that it allows at speed debug. The ASIC can run at full speed during code development since the in-circuit emulator restrictions are removed. Further, the internal/external processor mode of operation is eliminated since the embedded processor on the ASIC is used during code development. This also reduces the time and the costs associated with development since ASIC does not have to account for the timing/loading discrepancies between the two modes for verification. Further, because the instruction overlay harness allows for quick modifications to be made to the code, development time is decreased.

A further understanding of the nature and advantages of the invention described herein may be realized by reference to the remaining portion of the specification and the attached drawings.

DETAILED DESCRIPTION OF THE PREFERRED EMBODIMENTS

Figure 2:
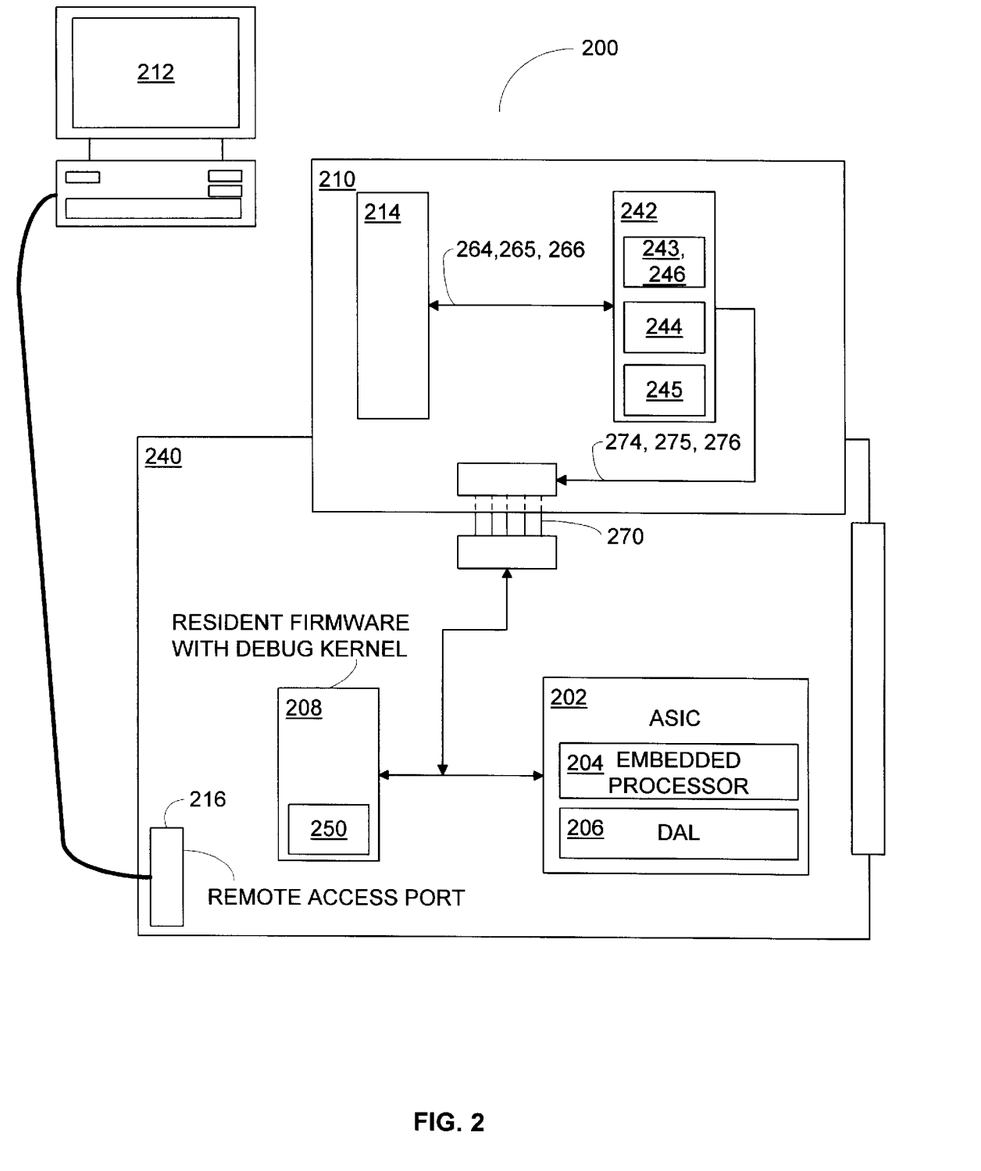
FIG. 2 is a block diagram of the hardware test and diagnosis system according to the present invention.

Referring to FIG. 2 is a block diagram of the hardware test and diagnosis system 200 according to the present invention. The test and diagnosis system shown in FIG. 2 includes an ASIC 202 that includes an embedded processor 204 and a debug assist logic unit (DAL) 206, a memory unit 208, an instruction overlay harness 210 and a monitoring means 212. The memory unit 208, instruction overlay harness 210, and monitoring means 212 are all electrically coupled to the ASIC 202.

Figure 3:
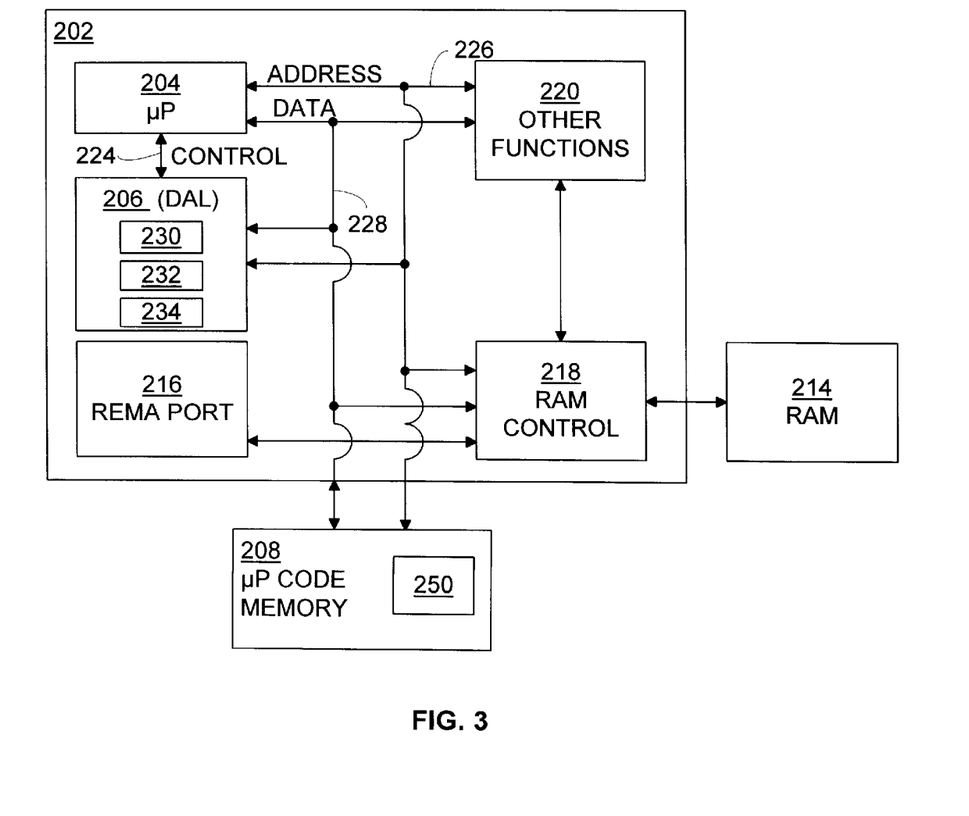
FIG. 3 shows a block diagram of ASIC used in the test and diagnosis system.

FIG. 3 shows a block diagram of ASIC 202 and external memory units 208 and 214 used in the test and diagnosis system. The ASIC 202 includes an embedded microprocessor 204, a DAL 206, a communications port 216, a RAM controller 218. A function controller 220 is representative of other control functions performed on the ASIC. A control bus 224 electrically couples the embedded microprocessor 204 to the DAL 206. An address bus 226 and a data bus 228 feed address and data signals and electrically couple the embedded microprocessor 204, the DAL 206, the REMA port 216, the function controller 220 and the RAM controller 218.

Figure 4:
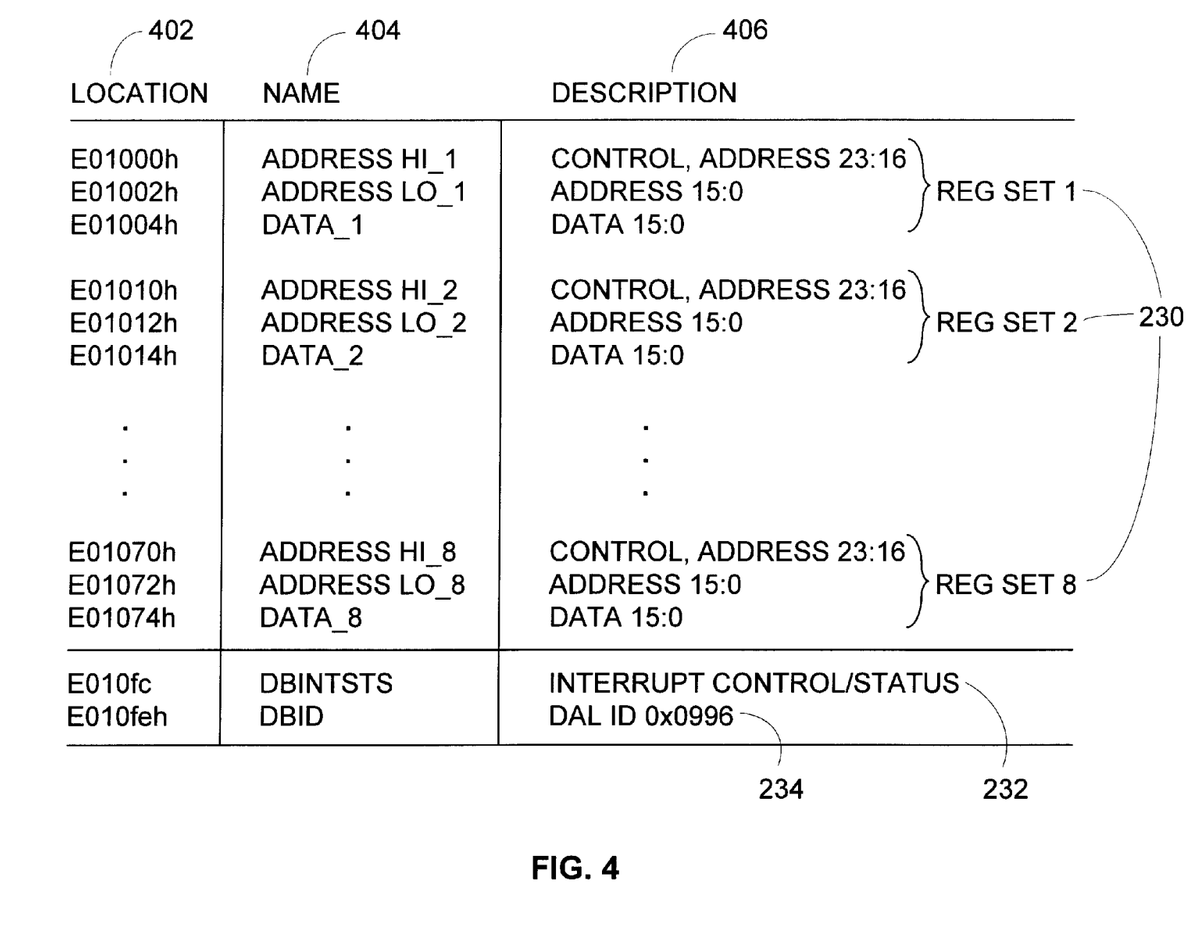
FIG. 4 shows a table that lists the DAL internal register locations.

Referring to FIG. 4 shows a table that lists the DAL 206 internal register locations.

In the preferred embodiment the DAL 206 is comprised of eight register sets 230, an interrupt control register 232 and an ID register 234. The DAL 206 is not relocate able and resides in dedicated internal register locations. Column 402 lists the internal memory locations of the address of the addresses named in column 404. Column 406 lists the description of the named register. Each register set has an ADDRESS HI_x location, an ADDRESS LO_x, and a DATA_x location associated with it. The symbol "_x" is representative of the "x" different register sets and in the present example is a number between one and eight.

The eight register sets 230 are programmable and may be programmed by the developer to interrupt the embedded processor's normal execution. Interrupt conditions are programmed by the developer using the monitor. Responsive to user commands, the debug kernel interprets the commands which may result in modifications to the control set in the DAL. The set of match conditions stored in the control set are stored in the internal registers of the DAL 206.

Figure 5:
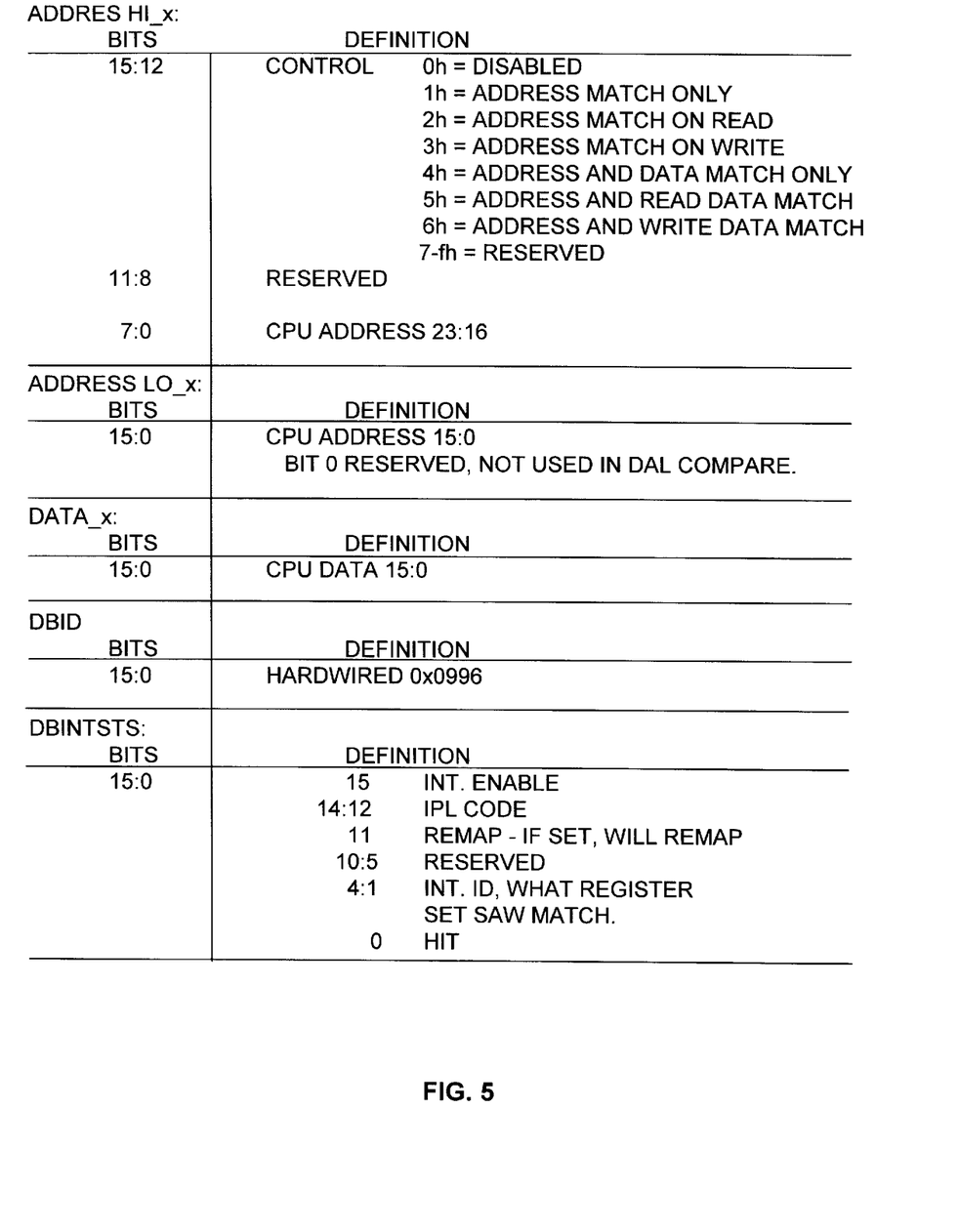
FIG. 5 is a table that lists the bit definitions of the eight register sets, the interrupt ID register (DBID), and the interrupt control register (DBINTSTS).

FIG. 5 is a table that lists the bit definitions of (1) the eight register sets, (2) the interrupt ID register (DBID), and (3) the interrupt control register (DBINTSTS). Specifically, referring to bits 15 to 12 of the ADDRESS HI_x location of the register set defines the control set bits which determines the interrupt conditions. For the control set shown in FIG. 5, an interrupt will occur for the following conditions: an address match on read, an address match on write, an address and data only match, an address and read data match, and an address and write data match. A match is a function of the type of access the CPU is performing. If the control field of the ADDRESS HI_x register equals 1 h, then a match occurs when the address of the CPU cycle matches that value in the CPU address bits of ADDRESS HI_x and ADDRESS LO_x. If the control field of a register set is 6 h, then a match occurs when the address and data of the CPU write cycle equals the values programed in ADDRESS HI_x and ADDRESS LO_x and DATA_x.

The DAL 206 provides the developer a mechanism for controlling the code execution flow. Programming the DAL registers (230, 232, or 234) and setting the appropriate bits of the control set allows an interrupt to be generated to the processor (external or internal) when a match of any enabled register set occurs. The DBINTSTS register 232 is the interrupt control register of the DAL. Bit 15 of the DBINTSTS register is the interrupt enable bit. When bit 15 of the DBINTSTS register is set, an interrupt from the DAL 206 will be asserted on the control bus 224 to the embedded processor 204. The interrupt line of the control bus 224 remains asserted until cleared by the CPU via a write of "0" to bits 4:0 of the DBINTSTS. Bits 4:1 of DBINTSTS show which register set/s (register sets 1–8) saw a match. When bit 0 of the DBINTSTS is set, it indicates that a hit or match has occurred. If multiple registers see a match, the hit bit (bit 0) will be set but the Interrupt ID field 4:1 of the DBINTSTS register will be 0x0.

The value programmed in the IPL field (bits 14:12 of the DBINTSTS register) represent the level of the interrupt. The gap in addresses between each register set allows for future features, i.e. masking registers. All of the DAL registers (230, 232, 234) are readable and all but the DBID 234 register is writeable. Reserved bits are non-writeable and return zeros on reads.

In the preferred embodiment of the present invention, the test system 200 includes both a FLASH memory 208 (a first memory unit) and an overlap instruction harness 210 that includes an overlay harness memory 214. The instruction overlay harness is an alternative memory that can be used in addition to FLASH memory 208. Thus, code can be downloaded into either FLASH memory 208 or into the instruction overlay memory 214 via the REMA port.

In the preferred embodiment, the overlay harness memory 214 is an SRAM which has much faster write speeds than the FLASH memory unit 208. Typically the write speed of the overlay harness memory is on the order of seconds faster than the FLASH memory unit 208. The faster speed of the overlay harness memory (SRAM) allows changes to be quickly made to the code on the fly, an important factor when doing debugging. The REMAP bit (bit 11) in the DBINTSTS register 232 can be used to REMAP or relocate the base address of the FLASH memory 208 such that it will start at 0x4000000 instead of 0x00000 (the original address before mapping the FLASH memory).

The ASIC containing the debug assist logic (DAL) and the microprocessor has a REMAP feature that allows the flash (ROM) memory decode address to be moved (or remapped) to a new address. In the preferred embodiment, this address is chosen so that firmware can be written in a way that will allow write access to flash memory whether the remap feature is enabled or not.

Figure 6:
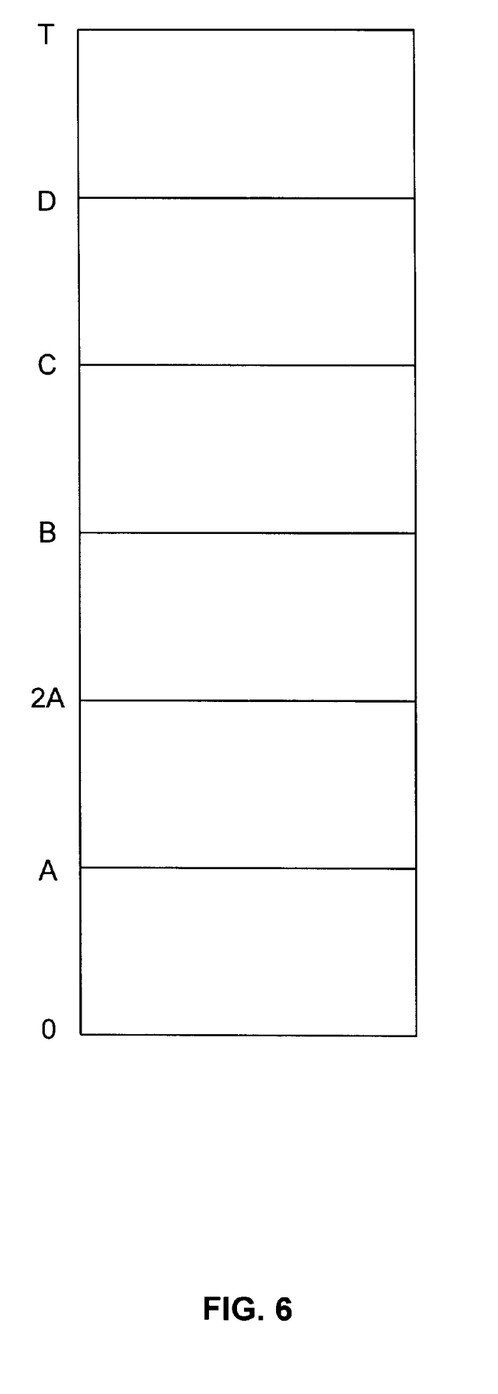
FIG. 6 shows a memory map for the embedded processor.

FIG. 6 shows a memory map for the embedded processor. The microprocessor's memory space is divided into regions, or blocks. The memory map shows an addressable range from address zero to the "top" of memory at address "T". Within this region are blocks that can be assigned to different purposes. These block boundaries are identified as "A", "2A", "B", "C", and "D".

In the preferred embodiment, the memory region from 0 to 2A is assigned to FLASH memory, but the actual components used occupy only the region from 0 to A. When the remap function is enabled by turning on the REMAP bit, the component(s) that would normally be addressed in the region from 0 to A are then addressed in the region extending from A to 2A. The actual physical address represented by A and 2A are chosen so that they differ in as few bits as possible. The remap function then selects which interpretation of these bits is desired for the address decode signal connected to the flash memory components.

It can be seen that when the REMAP bit is set, there is a "hole" in the memory map corresponding to the region from address 0 to address A. When the REMAP bit is set, the ASIC does not respond when the microprocessor accesses this memory region.

Figure 7:
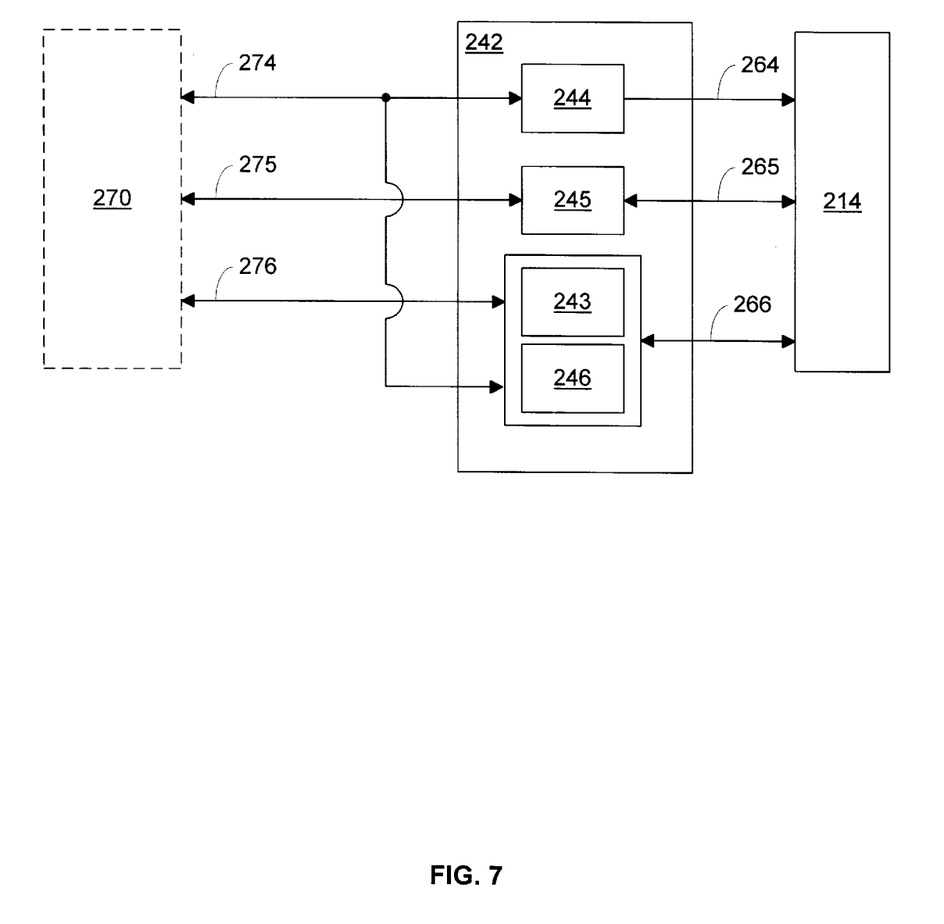
FIG. 7 shows a block diagram of the instruction overlay memory harness.

FIG. 7 shows a block diagram of the instruction overlay harness 210. The instruction overlay harness 210 is comprised of a control circuit 242 and an overlay harness memory 214. The control circuit 242 is typically comprised of an address decoder 243, an address buffer 244, a data buffer 245, and an enable register 246. The overlay control circuit 242 is electrically coupled to the overlay memory via an address bus 264, a data bus 265, and a control bus 266. Similarly, the overlay control circuit 242 is electrically coupled to connectors 270 via an address bus 274, a data bus 275 and a control bus 276. The connectors 270 provide a connection from the instruction overlay harness to the product as illustrated in FIG. 2.

When the microprocessor 204 enables the overlay harness, it does so by writing to the enable register 246. This write is decoded by the overlay harness address decoder 243. Once enabled, the address decoder 243 determines what addresses are mapped to the overlay harness memory 214. In the preferred embodiment, the overlay harness memory 214 is mapped into the memory "hole" created by the ASIC remap feature. The result is that the memory region from 0 to A now refers to the overlay harness memory and the region from A to 2A refers to the FLASH memory on the product under test.

The instruction overlay harness feature is intended for use by the bring up team. By remapping the FLASH memory 208, the bring up team can use the instruction overlay harness 210 that will act as the FLASH (maps to 0x00000 thru 0x2fffff.) Again using the testport, firmware writers can control and download code to the overlay harness memory 214. The select lines of the FLASH memory will not assert on this address range when the REMAP bit is set.

The test system ASIC includes port 216 preferably a Remote Access (REMA) port. The Remote Access Port of the ASIC allows the developer to download information into the instruction overlay memory. In the present invention, the REMA port 216 is used to reprogram code on the overlay harness 210 debug purposes. Changes to the program code are made on the fly, with small changes being typical. The REMA port 216 of the ASIC allows the developer to download information into the instruction overlay harness memory 214 of the product under development. The downloaded information is interpreted by the debug kernel which takes action by controlling the ASIC or Instruction overlay harness.

A monitor 212 electrically coupled to the REMA port of the ASIC which allows the user to be able to monitor externally the address/data fetches of the embedded microprocessor and to input commands to the debug kernel. For example, the user may input a command to modify the code to run on the embedded microprocessor or alternatively or may input a command which sets a breakpoint in the code at a point that is of particular interest to the person doing the debug.

Referring to FIG. 2, the instruction overlay harness 210 is not integrated on the ASIC, but instead is a separate module that attaches to the product under test 240. The instruction overlay harness 210 is used only in the test and diagnosis mode and is not typically part of the normally delivered product. When the REMAP bit of the DBINTSTS register 232 is set and the Enable Register 246 of the Instruction overlay harness is set, then the address normally generated by the microprocessor 204 is decoded by instruction overlay harness control circuit 243, causing the instruction overlay harness memory to respond instead of the flash memory. This allows code and data to be loaded into the instruction overlay harness memory 214 instead of Flash memory. The debug kernel 250 can still issue reads and writes to the flash memory by using the remapped flash address.

The present invention utilizes two functions implemented in the ASIC (the Debug Assist Logic and Remote Access Port) and two non-ASIC functions (the Instruction overlay harness and debug kernel.) These functions used together will allow the developer to trace/trap embedded processor cycles and modify/download processor code/data. The debug kernel 250 allows the developer to program the DAL registers that will interrupt the embedded microprocessor's normal execution. The debug kernel can also read and write to the instruction overlay memory 214.

The debug kernel 250 is part of the firmware on the product under development and is the software loaded onto the ASIC memory 208 that is used to transfer control back and forth between debug mode and normal instruction execution. The debug kernel 250 is invoked for use via notification thru the Remote Access Port 216. Once invoked, it will cause the embedded microprocessor 204 to set up the needed DAL 206 configuration, and to trace/trap microprocessor transactions when normal execution is resumed. The debug kernel 250 can also control memory downloads and is thus able to change code on the fly. Thus, once in the debug kernel 250, the code writer can issue special commands through the REMA port 216 that will set up the DAL 206 or download new code to the instruction overlay memory 214 that will be executed by the microprocessor 204 when transfer of control is returned to normal operation.

Because the test is run on the embedded microprocessor instead of an emulator, the test is run at speed. Using the monitor 212, the developer can externally monitor the code execution of the embedded microprocessor 204.

The debug kernel 250 allows control to be transferred back and forth between debug mode and normal instruction execution. Responsive to a match of the conditions stored in the control set conditions, the DAL 206 generates an interrupt to the embedded microprocessor 204 and transfers control to the debug kernel 250. Once in the debug kernel, the code writer can issue special commands through the Remote Access Port that will set up the DAL or download new code to the harness that will be executed by the microprocessor when transfer of control is returned to normal operation. Typically, when a command is issued from the user to modify the code, the command is deposited into memory, preferably the instruction overlay memory 214. The REMA port interrupts the microprocessor 204 to cause a transition into the debug kernel, which then processes the user's command, possibly altering the DAL registers, the code or data in the ASIC memory 208, or the code or data stored in the instruction overlay memory 214.

It is understood that the above description is intended to be illustrative and not restrictive. The scope of the invention should be determined with reference to the appended claims, along with the full scope of equivalents to which such claims are entitled.

What is claimed is:

1. A test and diagnosis system for testing an embedded microprocessor of a product under test, comprising:
   an ASIC, wherein the ASIC includes both the embedded microprocessor of the product under test and a debug assist logic means, the debug assist logic means for monitoring information from the embedded microprocessor of the product under test, the debug assist logic means electrically coupled to the embedded microprocessor of the product under test and including a plurality of storage means, the plurality of storage means including at least a first storage set means for storing a control set of match conditions, wherein responsive to a match of monitored information and the conditions set in the control set, the debug assist logic means generates an interrupt to the embedded microprocessor of the product under test; and
   debug software stored on a first memory means, the first memory means electrically coupled to the embedded processor of the product under test.

2. The test and diagnosis system recited in claim 1, wherein the test and diagnosis system is further comprised of an instruction overlay harness means including an instruction overlay memory means, the instruction overlay harness means being electrically coupled to the ASIC.

3. The test and diagnosis system recited in claim 2, wherein the instruction overlay harness means further includes an overlay harness address decoding means and an instruction overlay enablement means.

4. The test and diagnosis system recited in claim 1 wherein the debug assist logic means is electrically coupled to and monitors information from an address bus and a data bus, the address bus and data bus being electrically coupled to the embedded microprocessor.

5. The test and diagnosis system recited in claim 1 wherein responsive to interrupt generated by the debug assist logic means, control is transferred from execution code running on the embedded microprocessor of the product under test to the debug software.

6. The test and diagnosis system recited in claim 1 wherein the ASIC further includes a REMA port electrically coupled to a monitoring means.

7. A test and diagnosis system for testing an embedded microprocessor comprising:

an ASIC including the embedded microprocessor and a debug assist logic means, the debug assist logic means for monitoring information from the embedded microprocessor, the debug assist logic means electrically coupled to the embedded microprocessor and including a plurality of storage means, the plurality of storage means including at least a first storage set means for storing a control set of match conditions, wherein responsive to a match of monitored information and the conditions set in the control set, the debug assist logic means generates an interrupt to embedded microprocessor; and debug software stored on a first memory means, the first memory means electrically coupled to the embedded processor, wherein the test and diagnosis system is further comprised of an instruction overlay harness means including an instruction overlay memory means, the instruction overlay harness means being electrically coupled to the ASIC, wherein the instruction overlay harness means further includes an overlay harness address decoding means and an instruction overlay enablement means, wherein one of the plurality of storage means in the debug assist logic means is an interrupt control storage means, the interrupt control storage means including a REMAP bit for mapping portions of the first memory means to an address that does not conflict with the instruction overlay memory means.

8. A test and diagnosis system for testing an embedded microprocessor comprising:

an ASIC including the embedded microprocessor and a debug assist logic means, the debug assist logic means for monitoring information from the embedded microprocessor, the debug assist logic means electrically coupled to the embedded microprocessor and including a plurality of storage means, the plurality of storage means including at least a first storage set means for storing a control set of match conditions, wherein responsive to a match of monitored information and the conditions set in the control set, the debug assist logic means generates an interrupt to embedded microprocessor; and debug software stored on a first memory means, the first memory means electrically coupled to the embedded processor, wherein the debug assist logic means is electrically coupled to and monitors information from an address bus and a data bus, the address bus and data bus being electrically coupled to the embedded microprocessor, wherein a match of a condition stored in the control set occurs when an address stored in the at least one register set of the debug assist logic means matches the address on the address bus.

9. A test and diagnosis system for testing an embedded microprocessor comprising:

an ASIC including the embedded microprocessor and a debug assist logic means, the debug assist logic means for monitoring information from the embedded microprocessor, the debug assist logic means electrically coupled to the embedded microprocessor and including a plurality of storage means, the plurality of storage means including at least a first storage set means for storing a control set of match conditions, wherein responsive to a match of monitored information and the conditions set in the control set, the debug assist logic means generates an interrupt to embedded microprocessor; and debug software stored on a first memory means, the first memory means electrically coupled to the embedded processor wherein a match of a condition stored in the control set occurs when the data stored in the debug assist logic means matches the data on the data bus.

10. A test and diagnosis system for testing an embedded microprocessor comprising:

an ASIC including the embedded microprocessor and a debug assist logic means, the debug assist logic means for monitoring information from the embedded microprocessor, the debug assist logic means electrically coupled to the embedded microprocessor and including a plurality of storage means, the plurality of storage means including at least a first storage set means for storing a control set of match conditions, wherein responsive to a match of monitored information and the conditions set in the control set, the debug assist logic means generates an interrupt to embedded microprocessor; and debug software stored on a first memory means, the first memory means electrically coupled to the embedded processor wherein a match of a condition stored in the control set occurs when both (1) the address stored in the debug assist logic means matches the address information monitored by the debug assist logic means across the address bus and (2) the data stored in the debug assist logic means matches the data information monitored by the debug assist logic means across the data bus.

11. A test and diagnosis system for testing an embedded microprocessor comprising:

an ASIC including the embedded microprocessor and a debug assist logic means, the debug assist logic means for monitoring information from the embedded microprocessor, the debug assist logic means electrically coupled to the embedded microprocessor and including a plurality of storage means, the plurality of storage means including at least a first storage set means for storing a control set of match conditions, wherein responsive to a match of monitored information and the conditions set in the control set, the debug assist logic means generates an interrupt to embedded microprocessor; and debug software stored on a first memory means, the first memory means electrically coupled to the embedded processor wherein the plurality of registers of the debug assist logic means includes at least one register set, an interrupt control storage means and an ID storage means.

* * * * *